(12) United States Patent
Clermidy et al.

(10) Patent No.: US 7,733,771 B2
(45) Date of Patent: Jun. 8, 2010

(54) NOC SEMI-AUTOMATIC COMMUNICATION ARCHITECTURE FOR "DATA FLOWS" APPLICATIONS

(75) Inventors: Fabien Clermidy, St Egrève (FR);
Didier Lattard, Rencurel (FR); Didier Varreau, St Georges de Commiers (FR);
Christian Bernard, St Etienne de Crossey (FR)

(73) Assignee: Commissariat a l'Energie Atomique, Paris (FR)

( * ) Notice: Subject to any disclaimer, the term of this patent is extended or adjusted under 35 U.S.C. 154(b) by 1046 days.

(21) Appl. No.: 11/234,236

(22) Filed: Sep. 26, 2005

(65) Prior Publication Data
US 2006/0067218 A1    Mar. 30, 2006

(30) Foreign Application Priority Data
Sep. 28, 2004    (FR) .................................. 04 52182

(51) Int. Cl.
*G01R 31/08* (2006.01)
*G06K 5/00* (2006.01)

(52) U.S. Cl. ........................ 370/230; 370/229; 370/235; 370/412; 719/313; 719/317; 235/380; 235/439

(58) Field of Classification Search ................. 370/230, 370/229, 230.1, 235, 236, 236.1, 236.2, 412; 719/313, 314, 317, 312; 395/828, 200.5, 395/200.31; 705/39, 64, 67, 38, 10, 26; 455/556.1; 235/380, 439, 454, 383
See application file for complete search history.

(56) References Cited

U.S. PATENT DOCUMENTS

| | | | | |
|---|---|---|---|---|
| 4,970,506 A | * | 11/1990 | Sakaida et al. ........... 340/825.2 |
| 5,845,148 A | * | 12/1998 | Ichikawa et al. ............... 710/8 |
| 5,909,565 A | * | 6/1999 | Morikawa et al. ........... 712/200 |
| 7,032,005 B2 | * | 4/2006 | Mathon et al. .............. 709/206 |
| 2003/0167335 A1 | * | 9/2003 | Alexander .................. 709/228 |
| 2003/0223444 A1 | * | 12/2003 | Lambrecht .................. 370/412 |
| 2004/0131076 A1 | * | 7/2004 | Smith ......................... 370/432 |

(Continued)

FOREIGN PATENT DOCUMENTS

WO    WO 03/065236 A1    8/2003

OTHER PUBLICATIONS

Andrei Radulescu, et al., "An Efficient On-Chip Network Interface Offering Guaranteed Services, Shared-Memory Abstraction, and Flexible Network Configuration", proceedings of the Design, Automation and Test in Europe Conference and Exhibition, Feb. 16, 2004, pp. 1-6.

(Continued)

*Primary Examiner*—Aung S Moe
*Assistant Examiner*—Jamal Javaid
(74) *Attorney, Agent, or Firm*—Oblon, Spivak, McClelland, Maier & Neustadt, L.L.P.

(57) ABSTRACT

A data processing method in a network on chip formed of a plurality of processors configured to communicate between one another, and at least one network controller configured to initialize communications in the network, the method including: receiving and storing in a memory by a first processor, one or more credit management configuration programs received from the network controller, and establishing a first communication between at least said first processor and at least one second processor.

24 Claims, 5 Drawing Sheets

U.S. PATENT DOCUMENTS

2005/0044190 A1* 2/2005 Kawada et al. .............. 709/221
2006/0041889 A1* 2/2006 Radulescu et al. .......... 719/313

OTHER PUBLICATIONS

Andrei Radulescu, et al., "Communication Services for Networks on Chip", SAMOS, II, 2002, pp. 275-299.
Simon Moore, et al., "Point to Point GALS Interconnect", Proceedings of the Eighth International Symposium on Asynchronous Circuits and Systems, 2002, 7 pages.
E. Rijpkema, et al., "Trade-offs in the design of a router with both guaranteed and best-effort services for networks on chip", IEE Proc.-Comput. Digit. Tech., vol. 150, No. 5, Sep. 2003, pp. 294-302.
Khalid M. Al-Tawil, et al., "A Survey and Comparison of Wormhole Routing Techniques in Mesh Networks", IEEE Network, Mar./Apr. 1997, pp. 38-45.
Nilanjan Banerjee, et al., "A Power and Performance Model for Network-on-Chip Architectures", Proceedings of the Design, Automation and Test in Europe Conference and Exhibition, 2004, 6 pages.
Evgeny Bolotin, et al., "Cost considerations in network on chip", Elsevier, Integration, the VLSI journal vol. 38, 2004, pp. 19-42.
Xiaola Lin, et al., "The Message Flow Model for Routing in Wormhole-Routed Networks", IEEE Transactions on Parallel and Distributed Systems, vol. 6, No. 7, Jul. 1995, pp. 755-760.
John Bainbridge, et al. "Chain: A Delay-Insensitive Chip Area Interconnect", IEEE Micro, 2002, pp. 16-23.
A. Bystrov, et al., "Priority Arbiters", IEEE, 2000, pp. 128-137.
Christopher J. Glass, et al., "The Turn Model for Adaptive Routing", ACM, 1992, pp. 278-287.
Tomaz Felicijan, et al., "An Asynchronous On-Chip Network Router with Quality-of-Service (QoS) Support", IEEE, 2004, pp. 274-277.
Tomaz Felicijan, et al., "Quality of Service (QoS) for Asynchronous On-Chip Networks", 7 pages.

* cited by examiner

NOC SEMI-AUTOMATIC COMMUNICATION ARCHITECTURE FOR "DATA FLOWS" APPLICATIONS

TECHNICAL FIELD AND PRIOR ART

This invention relates to the field of NoC or "Network on Chip". It relates to an improved network on chip structure as well as improved communication and/or data processing methods in such a network.

One original feature of this structure is that it is capable of operating in a completely asynchronous manner and does not require any specialised logic.

Currently, to create communication between the different modules of a chip, it is bus topology means that are mainly used. With this type of topology, the modules of a chip that are to communicate with one another are connected to a same communication medium that they use in turn for example to emit data. One central element, called the bus or arbiter, provides the right of access to the medium for the different modules, in order to avoid bus allocation conflicts.

The main drawback of this system is that it has low communication flow rates, with high latency, as well as that it is increasingly difficult to make, especially as concerns the clock trees, and due to the problems of capacitive charge. It is moreover difficult to adapt precisely the flow rate guaranteed by a communication bus of a chip to the application which is made of all of the modules of the chip. Moreover, such a system is generally very specific to a given application and once designed for an application generally prevents it from being re-used for another application.

In the aim of improving the above mentioned problems, networks on chip or NoC appeared. These networks on chip use an interface layer permitting the communications between the different elements or resources of the network to be managed.

In the aim of making data processing flows, such networks on chip, may, according to one known operating mode, permit each resource of the network to process a set of data from one or more emitting resources and to send back a result of this processing to one or more receiving resources according to one scenario that has been previously defined. Once a resource has processed the data, the destination of the processed data is generally determined by a general controller or a network controller.

Often during processing said network controller has to make a decision concerning the data flow passing through the network.

The network controller is implemented to follow the progress of the data flow at all moments. In order to do so, it sends transmission orders to the emitting resources, then a calculation order to the resources. In a first possibility, the resources may inform the network controller of the state of progress of the processing that the latter are carrying out, for example via interruptions. As the network controller is likely to receive interruptions constantly, the data flow is pulsed.

In another possibility, a resource may inform the network controller of the end of processing that the latter has carried out, for example by means of flags sent to a network controller register. The latter then regularly sweeps said register to check the progress of the processing.

These two types of operation are very reliable, but not very efficient in terms of latency.

One proposed improved network interface was made by Radulescu and al. in "An Efficient On Chip Network Interface Offering Guaranteed Services, Shared-Memory Abstraction, and Flexible Network Configuration" Proceedings of DATE conf., 2004.

This document describes in particular a synchronous structure in which the TDMA ("Time division multiple access") and a credit system permit the traffic leaving the interface to be regulated in the direction of the network are used.

This interface can be set as concerns the data routing and the time division multiple access. However a network interface such as that proposed in this document is not suited to a data flow. The programming of the communications without using interruptions may also prove to be complex with this type of interface.

There is also the problem of finding a new network on chip structure adapted to the data flows, in which the communications are simplified with respect to the existing structures.

DESCRIPTION OF THE INVENTION

The invention proposes a data processing method in a network on chip improved with respect to the methods of the known prior art especially in terms of latency and simplicity of introduction of the communications between the different elements forming the network.

The network may be composed of a plurality of elements or "resources" capable of communicating with one another and carry out processing, and of at least one element or "network controller" capable of initialising the communications in the network by initialising a system of credits.

The processing process of the invention comprises at least a first communications step between at least a first resource and at least a second resource, said communication step comprising:

a) at least one emission by the first resource of a first plurality of special data or "credits" destined for the second resource, b) at least one receipt by the first resource of a first plurality of data to process sent by the second resource, the emission by the second data resource to process destined for the first resource being authorised following the receipt by the second resource of credits emitted by the first resource.

In this way, this process guarantees that the data to process emitted by a resource will be correctly received by one or more receiving resources and synchronise the data flows entering each of the network resources.

The process is capable of comprising at least a second communication step between said first resource and said second resource or a third resource, said second communication step comprising:

a') at least one emission by the first resource of a second plurality of special data or "credits" destined for the second or third resource, b') at least one receipt by the first resource of a second plurality of data to process sent by the second or third resource.

In the data processing method of the invention, in which the first resource can process at least part of the data that it receives by the second or third resource. This processing will depend on the nature of the first resource and may be for example, the storage of at least part of the data that the first resource receives, or, according to another example, a calculation on at least part of the data that the first resource receives, or, in a third example, the decoding of at least part of the data that the first resource receives.

Following the receipt of the first and/or second plurality of data to process, the first resource is capable of sending data to process and/or processed data, to a fourth resource.

The method implemented according to the invention is capable of comprising, prior to step a') or between steps a') and b') or after step b'), the transmission to a fourth resource, of at least part of the data to process received by the first resource during step b) and/or at least part of the data received by the first resource during step b) and processed by the first resource.

In this way, the data processing method implemented according to the invention permits the instants or time intervals that a resource consecrates to data processing to be coincided or merged as far as possible with the instants or time intervals that a resource consecrates to communications with other resources.

Prior to the beginning of the communications between the resources of the network, one or several transmission steps by the network controller of programming or configurations destined for the various resources of the network may take place.

The method of the invention may thus include one prior transmission step to the first resource, by said network controller, of data management configuration data, indicating one or more types of processing to be carried out on the data and/or at least one other resource to which the data to process or that has been processed is to be sent, then the storage of this data management configuration data in the memory of the first resource. The first resource is capable of memorising data management configuration data indicating one or more types of processing to be carried out on the data and/or at least on other resource to which the data to process or that has been processed is to be sent.

The data to process received during step b) and/or during step b') of the process of the invention may comprise data called tag data comprising data management configuration selection data from a plurality of stored data management configurations.

In this way the data to process received by a resource permits the operation of this resource to be programmed, as concerns the processing that it has to carry out on said data, as well as on the future destination of said data once processed.

The destination of the credits emitted by the first resource may be defined in common programming or "credit management configuration" that the first resource uses, the common "credit management configuration" being selected from several different credit management configurations stored in the memory of the first resource.

The credit management configurations of the first resource may be sent to the first resource by said network controller before being stored in memory, and possibly before any data or credit exchange between the network resources.

In this way, the series of communications that a resource will carry out with one or more other resources may be pre-programmed, and be carried out automatically during the data processing.

The steps a) and/or a') of the process may be preceded by a transmission, by the network controller of a start instruction for the communications in the network.

The network controller is also likely to send a sequential selection instruction of one or more credit management configurations, prior to step a) and/or step a').

According to one specific embodiment, said sequential selection instruction of one or more credit management configurations, may be included in the start instruction for the communications in the network.

The invention proposes a network on chip architecture formed by a plurality of elements or "resources" capable of communicating with one another and carrying out processing, and of at least one element or "network controller" capable of initialising the communications in the network.

The operation of a resource as concerns the communication and processing it carries out is determined in a programming or configuration that this resource uses. In a network architecture implemented according to the invention, the resources may be reset during data processing, as well as between two data processing operations.

One resource may thus be led to carry out at least a first series of communications with other resources following an instruction sent by the network controller, then to carry out at least a second series of different communications from the first series with other resources following said instruction or following another instruction sent by the network controllers During the processing of a data flow, a resource with such architecture may also be led to carry out at least a first series of processing, then to carry out at least a second series of processing different, from the first series.

A data flow in such architecture may flow as long as there is no complex decision to be taken as concerns the communications or configurations of the different resources.

The invention relates to a network on chip device comprising at least one element or "resource" capable of communicating with one or more other resources of the network and capable of carrying out at least one data processing, said resource comprising means forming an interface with the network comporting:
  emission means for special data or "credits" capable of emitting credits destined for one or more network resources,
  credit receipt means capable of receiving credits from one or more resources of the network,
  emission means for the data to process, capable of emitting the data to process destined for one or more resources of the network,
  receipt means for the data capable of receiving the data to process from one or more network resources, the means forming an interface with the network comprising among others:
  means for authorising the emission by said data emission means, of data to process destined of at least a first resource of said other resources of the network following the receipt, by said credit receipt means from said first resource.

The means forming a network interface of a resource used according to the invention may comprise moreover, means of authorising the data receipt by said data receipt means from at least a second resource, following the receipt of credits from the credit receipt means from said second resource.

The destination of credits being emitted by the credit emission means may depend on the type of credit management programming or configuration used by the network interface means. The network interface means may also comprise moreover:
  storage means capable of storing several different credit management configurations,
  configuration selection means capable of selecting according to at least one sequential instruction from the network controller, at least one common credit management configuration among said several credit management configurations.

The destination of the data capable of being emitted by the data emission means may depend on a type of data management programming or configuration used by the network interface means. The interface storage means may also permit several different data management configurations to be stored. The configuration selection means may permit moreover to select, according to at least one selection or "tag" data included in a data packet to process received by said data receiving means, at least one common data management configuration among said several data management configurations.

The means forming a network interface of the resource may comprise moreover means of emitting messages to the controller and in particular means of emitting interruptions in order, for example, for the resource to inform the network controller of the end of an action or processing, or that an error has occurred.

According to one particular embodiment, a resource according to the invention may comprise means to process several simultaneous or concurrent data and/or credit flows in input and means to process several simultaneous or concurrent data and/or credit flows in output.

According to another particular embodiment, a resource according to the invention may comprise means of processing several sequential data and/or credit flows in input and several sequential data and/or credit flows in output.

BRIEF DESCRIPTION OF THE DRAWINGS

This invention will be easier to understand after reading the description of the embodiments provided, purely by way of information and in no way restrictive, in reference to the appended drawings in which.

Identical, similar or equivalent parts of the different figures bear the same numerical references in order to make it easier when changing from one drawing to another.

The different parts shown in the drawings are not necessarily shown at a uniform scale, to make them easier to understand.

DETAILED DESCRIPTION

Figure 1:
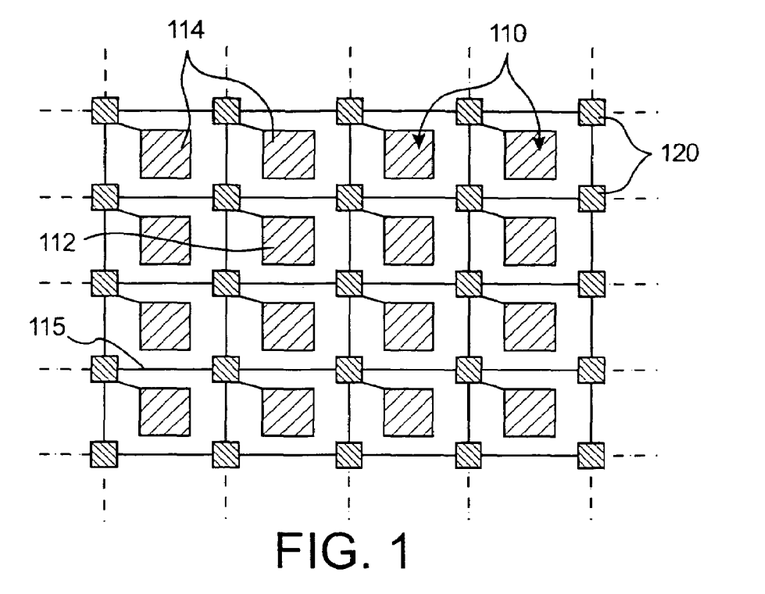
FIG. 1 shows an example of network on chip architecture implemented according to the invention.

FIG. 1 shows an example of network on chip or NoC architecture used according to the invention.

This architecture comprises a plurality of elements 110 capable of communicating with one another and of exchanging data. Links ref. 115, permit said elements 110 to be connected, whilst nodes ref. 120 permit a physical connection to be established between the different links 115 for switching of the communications. The nodes 120 may also be led to arbitrate the order of passage of several data packets issued for example from different links 115. This refereeing may be carried out for example according to a system of fixed priorities, "round robin" or even using a time division multiple access. The switching or routing could be carried out dynamically for example using the "odd even turn model" as defined in the document [1] or of the "message flow model" type as described in the document [2], or even a routing process as defined in the document [3]. The routing may also be static routing for example carried out by means of routing tables comprised in the nodes or horizontal then vertical routing algorithms.

The example of network on chip architecture illustrated in FIG. 1 has a mesh or matrix topology. In this way each node 120 is connected to four other neighbouring nodes as well as to one of said elements 110.

The network on chip architecture implemented according to the invention is not limited to this topology and may have any other topology, for example a hypercube type topology, or spindle, ring, or torus, etc. . . .

Among the set of elements 110 included in such architecture, at least one element ref. 112 plays the role of a master and permits in particular to initiate the communications on the network. This element 112 that we will call "network controller", thus has the possibility of programming the communications between a plurality of other elements of the network that we will call "resources" 114, and will permit to carry out tasks such as the processing of elementary data, for example calculations, or data storage, or data encoding/decoding.

The network controller 112 may have for example in the form of a micro-controller or a processor for example of the type ARM 940, LEON, or SPARC. The latter may also have a function, in particular for carrying out calculations and managing interruptions. The network on-chip architecture according to the invention may be equipped with one or even several network controllers.

Each of the resources 114 may be of generic type, for example in the form of a processor or a DSP (Digital Signal Processor) or specific type for example in the form of a specialised processing module, for example such as a specialised module in the calculation of a FFT (Fast Fourier Transform) or for example such as an MPEG (moving pictures expert groups) encoding and/or decoding module or a memory module for example of the SRAM type (static random access memory).

Each resource 114 of the network structure comprises a part or means that we will call the "functional core", dedicated in particular to data processing and/or calculations, as well as another part or means that we will call "network interface", and which will permit the resource 114 to communicate with the network.

Figure 2:
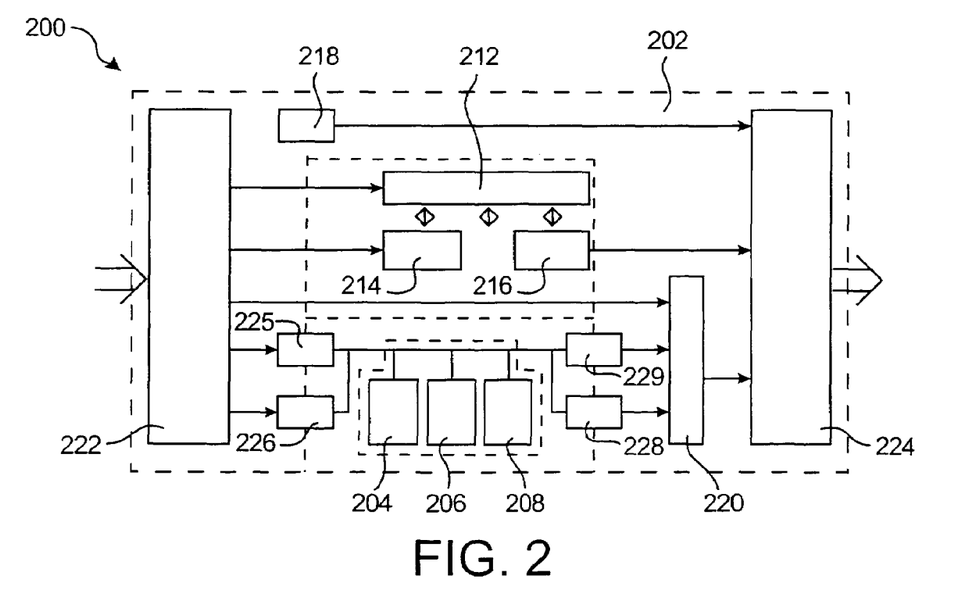
FIG. 2 shows an example of a detailed structure of a network on chip resource implemented according to the invention.

One example of a detailed structure of a resource 200 and more particularly means forming a network interface 202 of the resource are shown in FIG. 2.

This network interface 202 comprises first of all a module 212, permitting the commands received in input from the resource 200 to be decoded, and from other resources or a network controller. Among these commands may be in particular data reading or writing commands. Special data emission commands that we will call "credits", and which come from other resources, communication initialisation commands from the network controller, or programming or configurations from the network controller permitting the operating parameters of certain modules of the resource 200 to be set may also be received.

A module called "configuration management" 214 of the network interface 202 is designed to receive different programs or "configurations" designed to set the parameters of the network interface 202 and/or of the operating core (not shown) of the resource 200. These configurations or programs may be stored in the memory of the resource 200 in registers belonging to calculation blocks units ref. 204, 206, 208.

Depending on the commands or instructions sent by the network controller, and/or the tags included in the data sent from the other resources of the network, the module 214 may also allow the decision to be made whether to use one or more common configurations from said configurations stored that the resource 200 has in memory.

Using for example a type of configuration that we will call "credit management configuration", the configuration management module 214 may permit in particular the operating parameters of a module of the network interface 202 to be set, called here the "ICC" ("Input Communication Controller") and ref. 218.

The input communication controller 218 is associated to one or more input storage means, through which data entering the resource will pass. These storage means may be for example in the form of one or more FIFO units, for example two FIFO units ref. 225 and 226, or one or more memories, whose module input communication controller is capable of identifying the fill rate as well as the free addresses.

Depending on how its parameters are set, the input communication controller module 218 permits the resource 200 in particular to transmit special data called "credits" to other network resources, using a credit emission mechanism, implemented to synchronise the communications in the network.

Such a mechanism provides that a first resource, when it is designed to receive data to process or transmit that comes from a second resource, sends beforehand credits to the second resource to signal that the latter is authorised to send said data to process or transmit, in accordance with the credit management configuration that the first resource uses.

The number of credits sent by the first resource can indicate to the second resource, the quantity of data that this second resource is authorised to send to the first resource. This number of credits depends on the free input space that the first resource has, as well as the quantity of data that the first resource is supposed to receive from the second resource. As previously described, this quantity of data is indicated in the common credit management configuration that the first resource uses.

Once it is authorised to emit after receiving the credits, the second resource is capable of emitting as much data as the number of credits sent by the first resource allows it. In this way, the credits sent from the first resource to the second resource permits a route to be opened for data from the second resource destined for the first resource. This credit emission mechanism guarantees that data sent by the second resource will be correctly received by the first resource.

Using another type of configuration that we will call "data management configuration", the configuration management module 214 can allow in particular the parameters of the operating core (not shown) of the resource 200 to be set and in particular the manner in which this operating core will process the data that the resource 200 receives. For example when the operating core is designed to carry out FFT processing, a data management configuration can indicate the number of calculation points to be taken into account to carry out this processing.

The data to process emitted from a second resource to a first resource is in the form of blocks or packets, in which appear, for example in the header, one or more tags. These tags may permit in particular an identification to be attributed to several or each of said data blocks or packets. In this way, the first resource can carry out scheduling of the packets it receives, or identify the start of a new calculation or new processing to be carried out. The tags may also include one or more identifiers allowing to indicate to the first resource receiving the data from the second resource, the common data management configuration that this first resource must adopt to process said data.

With the help of said "data management configuration", the configuration management module 214 may furthermore set the operating parameters of another module of the network interface called the "OCC" ("Output Communication Controller") ref. 220.

The output communication controller module 220 is associated to one or more output storage means, through which will pass the data leaving the resource 200. These storage means may be in the form of one or more FIFO units, for example two FIFO units 228 and 229, or one or more sequential access writing and random reading memories, or one or more memories whose output communication controller can identify the fill rate and the free addresses.

The output communication controller 220 may be provided such that in particular, depending on the way that its parameters are set, it can create the data packets to be transmitted to one or more other receiving resources and in which appear the tags. The tags-system indicates to the resource and in particular to the resource 200 receiving the data packets to which resource(s) these data packets are to be re-emitted. In this way, the header tags of a data packet may include one or more other identifiers which indicate to the resource, the destination of the data that the latter processes.

The network interface 202 also comprises an input port 222 and an output port 224. These ports 222 and 224 respectively permit the data or credits arriving in the resource 200 to be directed to the different modules of the latter, and to arbitrate the emission of data or credits at the resource output 200.

A resource structure belonging to a network on chip used according to the invention, may allow several incoming data flows from different network resources to be processed. This management may be carried out sequentially or simultaneously and will depend on the number of receiving means, for example in the form of FIFO units ("First In First Out"), of which said resource has its input.

In the same way, a resource belonging to a network on chip implemented according to the invention may permit several outgoing data flows to be processed destined for different resources. This management may be carried out sequentially or simultaneously, and will depend on a number of emitting means, for example in the form of FIFO units, of which said resource has at its input.

According to several possible variants implementations of a network on chip structure according to the invention, the management of the data flows and the credit flows may be the same for all of the resources of the network, or differ from one resource to another.

It is possible to have for example in a same network, at least one first resource with a single FIFO unit at the input and a single FIFO unit at the output, capable of processing at least two sequential flows at the input and capable of generating at least two sequential flows at the output, to at least two different resources. It is also possible to have in this same network example at least one second resource with two FIFO units at the input and a FIFO unit at the output, capable of processing two concurrent flows at the input and generate two sequential flows at the output. According to this same example, we can also have a third resource with two FIFO units at the input and two FIFO units at the output capable of processing two concurrent flows at the input and two concurrent flows at the output.

The management configuration module 214 of the resource 200 can also permit the operating parameters of another module ref. 216 to be set, which permits interruptions to be generated intended especially for a network controller, and possibly the operating core (not shown) of the resource 200. Among the interruptions that this interruption management module 216 is capable of producing, there may be interruptions that we will call "informative", and which permit for example to warn the network controller that the resource 200 has completed the action or processing.

It may be provided for example that the interruption management module 216 sends an interruption to the network controller when the resource 200 has completed all of the data processing it has to do.

It may also be provided that the interruption management module 216 of the resource 200, generates an interruption destined for the network controller when the resource 200 has completed the emission of all the credits destined for another resource (not shown in the drawing) capable of sending it data, or when the resource 200 has finished emitting all the credits destined for all the other resources (not shown in the drawing) capable of sending it data.

The interruption management module 216 may also be provided to emit an interruption in the case of the resource 200 detecting an error, or a piece of information that the latter cannot process.

For example, in the case of the identifiers of a tag included in a data packet received by the resource 200, not corresponding to any of the data management configurations that this resource has, it may be provided that the resource 200 emits an interruption to the network controller so that the latter takes charge of the processing of said data packet.

In another example, in the case of the resource 200 processing for example the calculation of a Fourier transformation, the interruption management module 216 may be provided so that it generates an interruption destined for the network controller when saturation at processing level is detected, so that another interruption occurs at the operating core, so that the latter stops the processing in progress.

In relation with FIGS. 3A-3M, an example of the operation of a network on chip architecture according to the invention, and in particular that of a given resource of the network reference 310, will now be described. The network is used in this example, as part of the processing of a data flow.

Figure 3A:
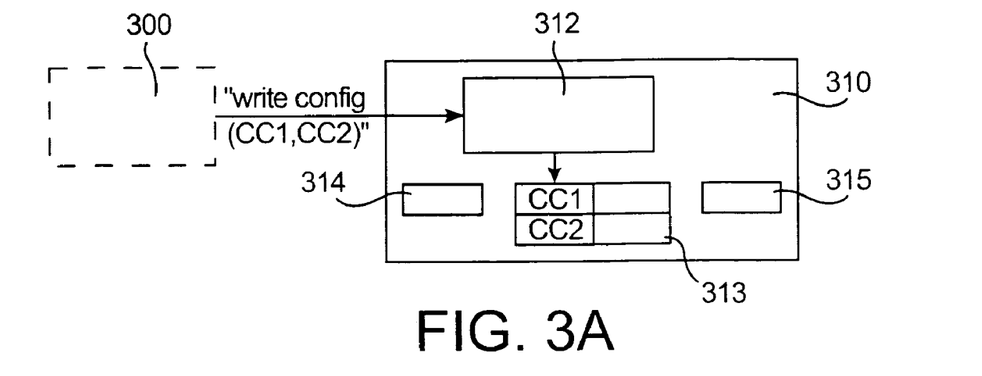
FIGS. 3A-3M show different steps of an example of a process implemented according to the invention.

In a first phase, prior to the start of said processing, a network controller ref. 300 sends first of all, to each of the network resources and in particular to the resource 310, a set of configurations. These configurations are programmes both destined for the operating core and the network interface of the resources, and that the latter are capable of using during said processing.

A configuration may be sent by the network controller 300 in the form of special data packets. These special data packets may be formed by a header, comprising a field indicating to a resource receiving the configuration, the register(s) in which this configuration will be stored.

Each resource receives a set of configurations that is specific to it. Among a set of configurations that a resource is likely to receive, there may be one or more configurations of a type we will call "credit management".

The role of the credit management configurations is to ensure the synchronisation of the communications between the various resources of the network, in addition to that of avoiding the network from becoming saturated. The credit management configurations are programs used by the network interface of a resource which indicates to said interface the manner in which the data flows entering said resource are to be managed.

In this way, the network controller 300 sends for example in a first step, an instruction ref. "write config (CC1, CC2)" comprising two different programs or credit management configurations "CC1" and "CC2" to the resource 310. The resource 310 then decodes this instruction by means of its decoder module 312 then stores the "CC1" and "CC2" configurations by means of its configurations management module 313 (FIG. 3A).

In a credit management configuration, for example in the "CC1" credit management configuration there may be in particular indicated the identity of a resource that we will call "first emitting resource" that is designed to emit data to the resource 310. The identity of the first emitting resource may be indicated directly, for example using an identity number, or indirectly, for example by indicating the path leading to this first emitting resource. In the "CC1" credit management configuration, there is also indicated for the resource 310, a number of credits to be sent to the first emitting resource. This number of credits corresponds to a quantity of data that the first emitting resource will be authorised to emit to the resource 310. A credit emission register belonging to the output communication controller 220 to be selected, in this way a threshold for the transmission of the credits, which is to say a minimum number of free places in FIFO 228 and/or 229 free with respect to the transmission of the credits may also be indicated in such a credit management configuration.

Several other resources may be designed to send data to the resource 310, and especially for example a second emitting resource. The resource 310 may have other credit management configurations, for example the "CC2" configuration to allow it to manage the data flows from the second emitting resource.

The different credit management configurations "CC1" and "CC2" of which the given resource 310 disposes, may be used by this resource 310 in an order or sequence pre-established by the network controller 300.

According to several possibilities, in function of which the architecture of the resource 310 has been created, and especially in function of its input storage means, for example in function of the number of input FIFO units associated to (the communication controller input 314 of the resource 310, it may be provided that this resource 310 can use, among the credit management configurations of which it disposes, a single credit management configuration both for one or more input FIFOs, or even several credit management configurations simultaneously.

Moreover, according to one different embodiment from that which has just been described for the "CC1" and "CC2" configurations, it may be provided that a given credit management configuration concerns one transmission of credits destined for several "emitting" resources instead of a single one.

Figure 3B:
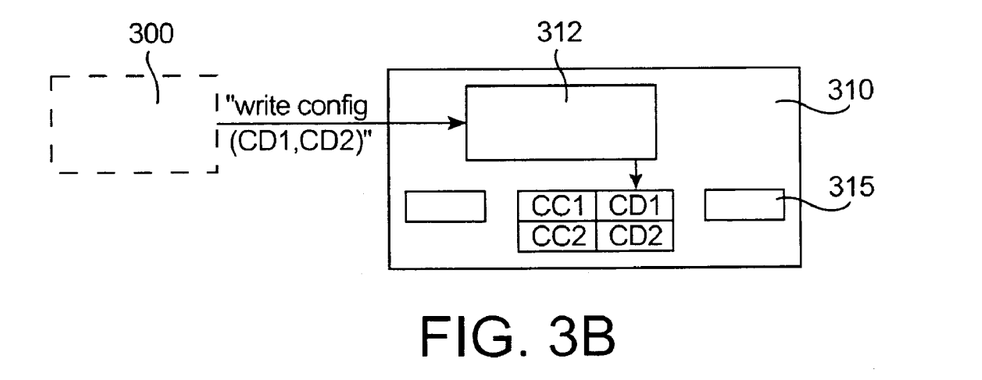

Among the configurations that the network controller sends to the resource 310, also appears one or more configurations of the type we will call "data management". A data management configuration is a program that can be used both by the operating core and by the interface of a resource. This type of configuration comprises a part which indicates to the operating core of a resource the manner in which this core will process the data entering the resource, and another part to the network interface of this same resource, the destination of the data, for example once this data has been processed.

In this way, the network controller 300 sends for example, in a second step, an instruction ref. "write config (CD1, CD2)" comprising two different data management programmes or configurations "CD1" and "CD2" to the resource 310 (FIG. 3B).

In one of the data management configurations that the resource 310 receives, for example in the "CD1" configuration, may be indicated especially the identity of a resource that we will call "first receiving resource" that is designed to receive the data of the resource 310.

The identity of She first receiving resource may be indicated directly, for example using an identity number, or indirectly, for example by indicating the path leading to this receiving resource. In the "CD1" configuration there may be also indicated for the resource 310, a number of data to be sent to the first receiving resource. A data register to be selected, which is to say for example a FIFO unit at the input of the receiving resource or a configuration register of the receiving resource to be selected, so that a threshold for the data transmission, which is to say a minimum number of data present in the FIFO unit 228 and/or 229 prior to the transmission of a data packet may also be indicated in such a data management configuration.

Several other resources may be designed to receive data of the resource 310 and especially a second receiving resource that we will give the reference 350. The resource 310 can in this way dispose of other data management configurations, for example the "CD2" configuration, to permit it to manage the data flows in the direction of this second receiving resource 350.

According to several possibilities, in function of which the architecture of the resource 310 has been created, and especially in function of the number of FIFO units associated to the output communications controller 315 of the resource 310, it may be provided that the latter may use, among the set of data management configurations of which it disposes, a single data management configuration at once, or several data management configurations simultaneously.

Moreover, one implantation mode that is different from that which has just been described for the data management configurations "CD1" and "CD2", and in which a data management configuration concerns a transmission of data to several "receiving" resources instead of a single one may be provided.

All of the different "CD1" and "CD2" data management configurations, of which the resource 310 disposes will moreover be used by this resource 310 according to an order or sequence established by a tag mechanism that we will describe later.

Once the credit management and data management configurations have been sent by the network controller, a second network operating phase can start, in which the different resources communicate with one another and each carry out part of the data flow processing.

This second phase is initialised by the network controller by sending a start command. The order in which the resources receive this command may be random. This start command indicates to the resource receiving it to start communications with one or more other resources of the network. This command may also comprise a program or configuration that we will call "chaining configuration". A "chaining" configuration permits an order or a sequence to be established in which a resource will use the different credit management configurations that it disposes of. A given resource receiving such a chaining configuration, could automatically change the credit management configuration during processing. In this way, a given resource that has, during processing, used a common credit management configuration to the end or until the credits have been used up, can identify the following credit management configuration to be used and use this next credit management configuration as a common credit management configuration.

In a first example, the resource 310 can receive from the network controller 300 a chaining configuration informing it to use k times consecutively (with k being an integer) the "CC1" credit management configuration.

In another example, the resource 310 can receive a chaining configuration informing it to use k times consecutively (with k being an integer) the "CC1" credit management configuration and then to use m times (with m being an integer) the "CC2" credit management configuration.

In a third example, the resource 310 can receive a chaining configuration informing it to use the "CC1" then "CC2" configurations n times consecutively (with n being an integer).

In a fourth example, the resource 310 can receive a chaining configuration informing it to use the "CC1" configuration indefinitely.

Figure 3C:
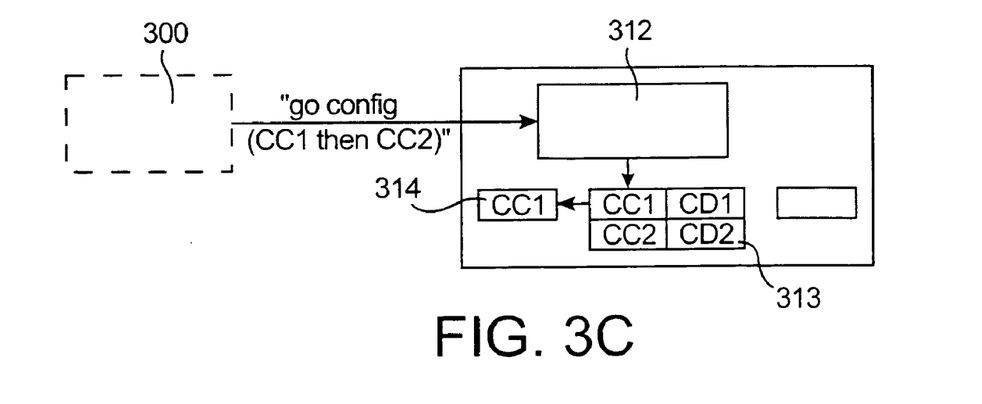

FIG. 3C shows one case, provided by way of example, where the resource 310 receives an instruction ref. "go CC1 then CC2". This instruction comprises an order to start communications for the resource 310, so that a chaining configuration informing the resource 310 to use the "CC1" credit management configuration then the "CC2" credit management configuration.

Such an instruction is firstly decoded by the decoder module 312 of the resource 310 and transmitted to the configurations management module 313, which decides to load the first credit management "CC1" configuration selected in the input communication controller 314. This means that a counter of the input communication controller 314 is loaded with the total number of credits in the "CC1" configuration, and the local registers of this input communication controller 314, with the other information of this configuration "CC1".

Figure 3D:
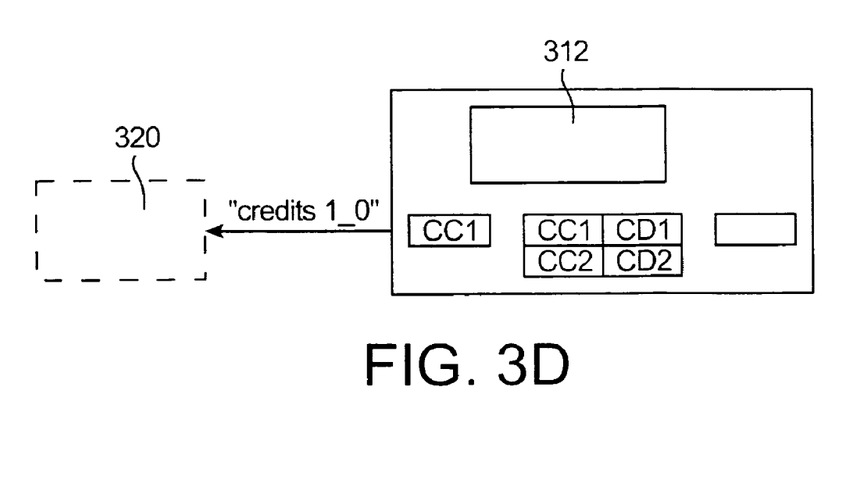

The content of the input FIFO unit associated to the "CC1" configuration is then checked. Depending on the space available in this FIFO unit, with a transmission threshold for the credits, the information controller decides if one or more first credit packets ref. "credits 1_0" are sent to said first emitting resource ref. 320 (FIG. 3D). To do so, the information controller creates a header packet by using the information on the path, credit transmission threshold and destination register(s) written into the "CC1" configuration. In parallel, the total number of credits available to be sent to the first emitting resource 320 is decremented and the number of credits sent to the first emitting resource 320 is incremented.

The first emitting resource 320 then receives the credit packet "credits 1_0" and adds these credits to one of its registers in compliance with the information in the credit packet "credits 1_0" received.

This first emitting resource 320 firstly receives a data management configuration in which is indicated especially a register or a FIFO unit to be used to allow the data to be sent. According to its data management configuration and the data available of which the first emitting resource 320 disposes, the latter can then decide whether to send one or more first data packets "data 1_0" to the resource 310.

When the resource 310 receives the data "data 1_0", the number of credits that this resource 310 is capable of sending to the first emitting resource 320 is then decremented. The emission of one or more new credit packets is then triggered. This mechanism of credit emission/receipt of data depending on said credits, then continues until the total number of credits in the "CC1" configuration is used up.

As concerns the "data 1_0" sent from the first emitting resource 320 to the given resource 310, this data may be in the form of a set of packets, in which appear, for example in the header, at least one tag ref. "tag_1". This tag tag_1 makes it possible to indicate to the given resource 310 receiving the data from the first emitting resource 320, the common data management configuration among the "CD1" and CD2" configurations that the resource 310 has to adopt, especially to process said data. In this way the tag "tag_1" can indicate to the resource 310, the manner in which the latter has to process the data and especially the data 1_0 it receives and the destination of this data once it has been processed.

Figure 3E:
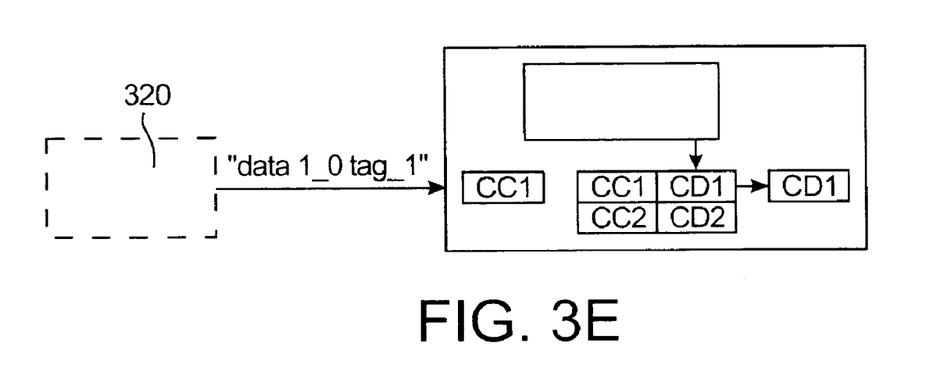
Figure 3F:
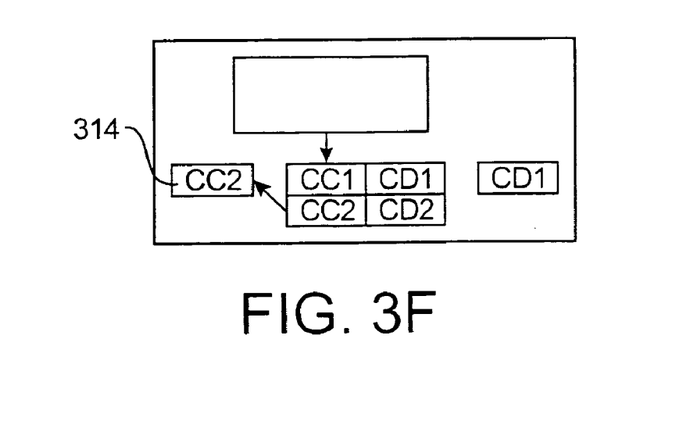

The "tag_1" comprises a special command indicating the common data management configuration, for example the "CD1" configuration, to be used to process the data packet(s) emitted by the first resource 320. The "CD1" data management configuration of the core and the outgoing communications are then loaded in the local registers of the resource 310 (FIG. 3E). As concerns the outgoing communications of the resource 310, the local registers of the outgoing information controller 315 are loaded with information of the data total, data transmission threshold and register or FIFO unit associated to the outgoing information controller 315 for the transmission of the data.

The resource 310 then processes the data 1_0 emitted by the first emitting resource 320. The operating core of the resource 310 carries out this processing, according to a mode indicated by the "CD1" data management configuration.

When the total number of credits indicated in the "CC1" configuration has been sent to the first emitting resource 320, the second credit management configuration "CC2" is then loaded automatically and acts as the common credit management configuration (FIG. 3F), in compliance with the indications in the chaining configuration of the configurations that the resource 310 receives from the communication controller 300 during the step previously described with respect to FIG. 3C.

Figure 3G:
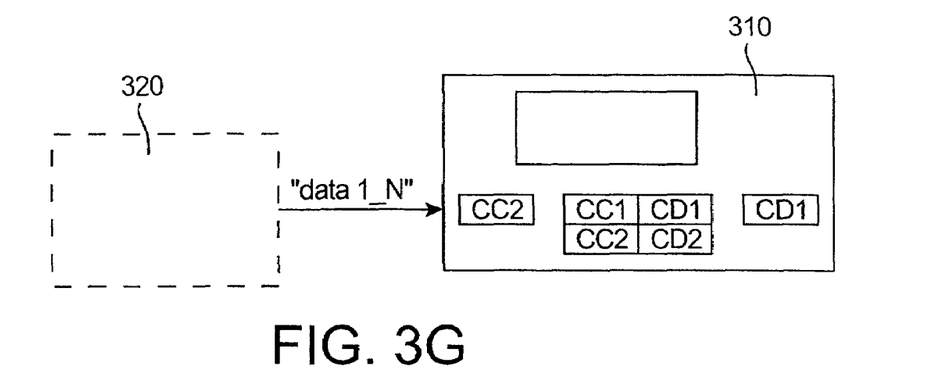

The first emitting resource 320 then completes the transmission of the last "data 1_N" data that it has to send to the resource 310 (FIG. 3G). A new common data management configuration can be loaded and used by the resource 310 as soon as the latter receives a new tag.

Figure 3H:
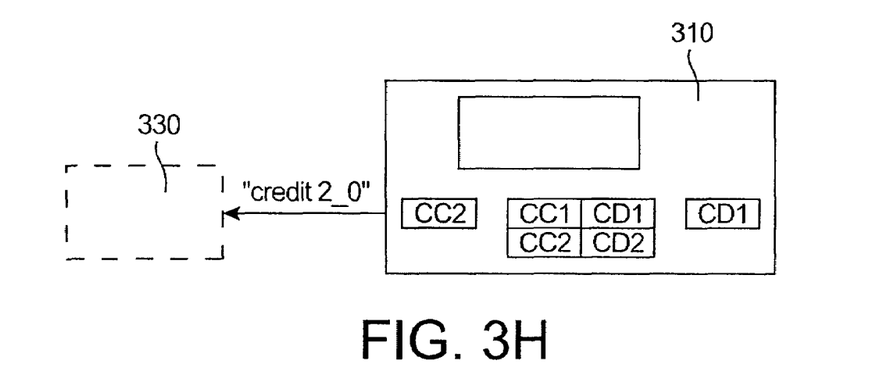

The resource 310 then starts to send the "credits 2_0" credits to the second emitting resource 330, in compliance with the indications of the new common credit management configuration "CC2" loaded by the resource 200 (FIG. 3H).

Figure 3I:
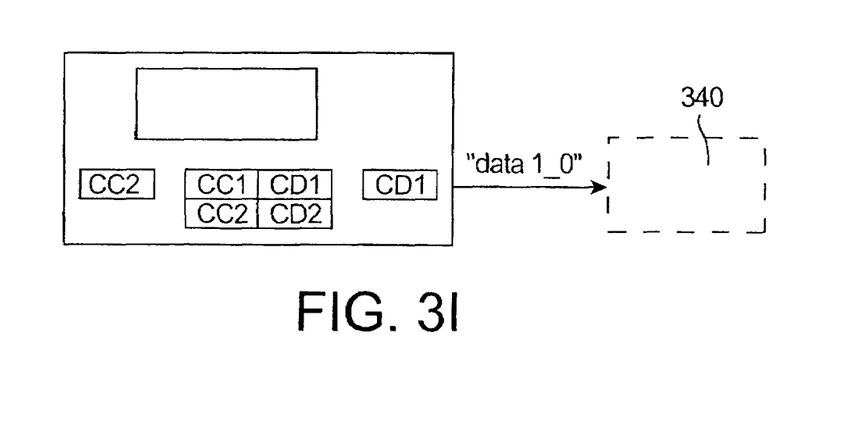

Data 1_0 initially from the first emitting resource 320 and on which the resource 310 may possibly have processed, is then sent to a first receiving resource 340, in a mode complying with the indications in the "CD1" data management configuration acting as the common data management configuration (FIG. 3I).

Figure 3J:
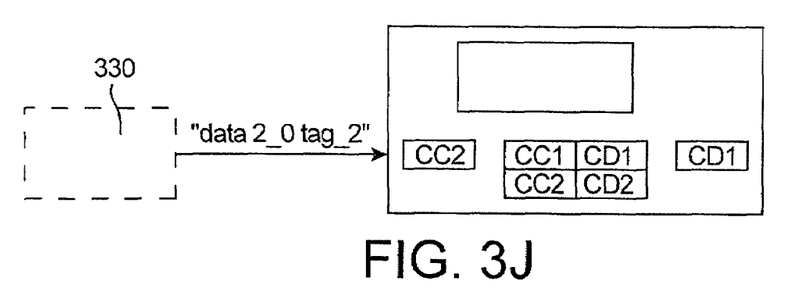

The resource 310 then receives, in response to the "credits 2_0", "data 2_0" data from the second emitting resource 330, with a header of this data, a "tag_2" tag advising the resource 310 to change the data management configuration, and for example to use the "CD2" configuration (FIG. 3J). The "CD2" data management configuration can be used as the common data management configuration as soon as the "CD1" data management configuration is finished. The resource 310 then sends (according to a step not shown) in compliance with the common data management configuration "CD1", the latest "data 1_N" that may or may not have been processed, destined for the first receiving resource 340.

The second emitting resource 330, possibly sends (according to a step not shown) at the same time data to the resource 310.

Figure 3K:
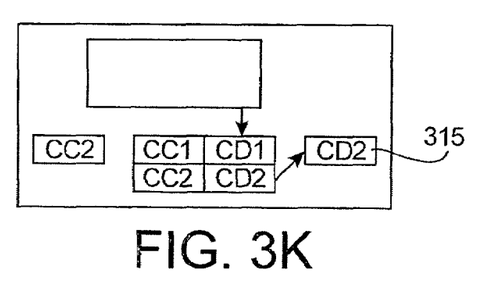

Then, as soon as the latest data 1_0 destined for the first receiving resource 340 is sent, the common data management configuration used by the resource 310, can then be changed. Another "CD2" data management configuration may then be loaded in the outgoing information controller 315 of the resource and used by the latter (FIG. 3K).

Figure 3L:
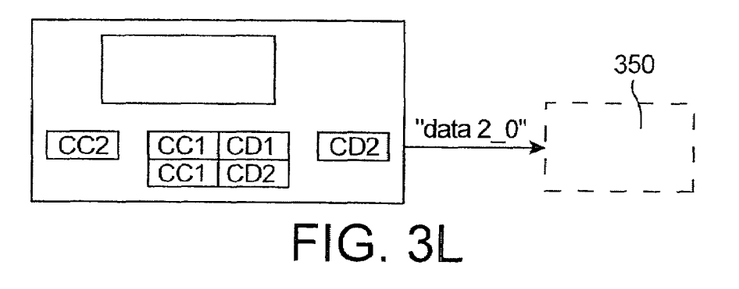

Subsequently, in compliance with the indications of the data management configuration "CD2" used by the resource 310, the latter emits "data 2_0" that may have just been processed to a second receiving resource 350 (FIG. 3L).

Figure 3M:
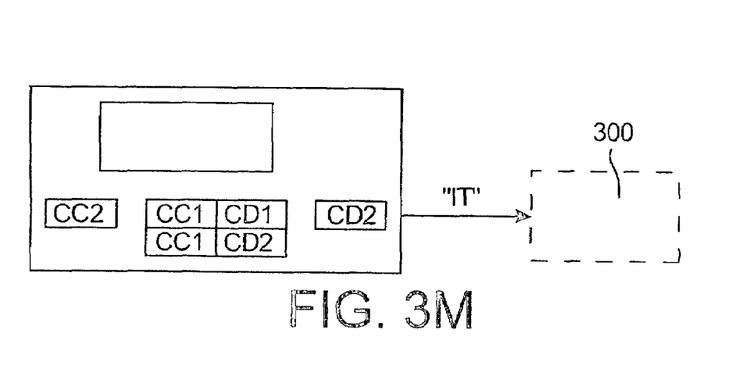

Once the resource 310 has received all the data it has to process, and has sent all the data it has to transmit, it can stop operating and possibly send an "IT" interruption to the network controller 300 (FIG. 3M).

According to one embodiment, the interruption may be sent to the network controller 300 once the resource 310 has used all of the credit management configurations it is supposed to use, in compliance with the indications of the chaining configuration sent by the network controller.

The processing of the data flow may then be stopped when the last of the network resources which had data to process emits an interruption destined for the network controller.

During the second operating phase, interruptions of the resource 310 may be sent to the network controller, for example in the case of this resource 310 detecting an error or receiving a tag that does not correspond to the configurations it is provided with.

In this way, in the operation described, the processing of the data flow in the second phase is therefore likely to be carried out automatically without interruption and asynchronously without any intervention from the network controller, and without any synchronisation by means of a clock being necessary.

Moreover, as the programming of the communications is independent from the programming of the data processing, a system such as that previously described may permit at most to overlap or coincide the time intervals during which the resource processes and the time intervals in which this same resource communicates with the other resources.

An example of an application by such a network structure may be the processing of telecommunications frames of fourth generation standard such as MC-CDMA ("multi-carrier Code Division Multiple Access" or CDMA multi-antennae).

For this type of application, the network controller may be a processor suited to making complex decision. The processing of a frame by a network on chip used according to the invention may then be as follows:

On receipt of the frame, a first operating mode, during which the network decodes if the header of the frame may be adopted. To do so, all of the resources of the network are then specifically configured by the network controller to process the decoding of a frame header.

A first resource may be dedicated for example to identifying the start of the frame and to the automatic transmission of the header to another resource. The rest of the frame is then sent to a resource acting as a memory.

At the end of the header decoding, the resource with the final completely decoded information sends an interruption to the network controller to indicate that the decoding is complete.

According to a second operating phase, the rest of the frame is decoded according to the information provided by the header that is first decoded.

The network controller then deduces from the header information, new credit management configurations and calculations for some or possibly each of the resources of the network. The controller then sends these configurations via the network to each resource interface.

After reconfiguring the resources, the network controller then sends a start order. As soon as the start order is received by the interfaces, the rest of the frame processing is carried out automatically. The different resources each carry out elementary processing and communicate with one another to exchange the processed data or to process the frame.

At the end of the processing, an interruption is sent by the resources to warn the network controller.

A network chip structure used for such an application may use several variants of network interface architecture according to the invention.

In this way, certain resources of the network structure may be implemented to receive sequentially data flows from several other resources. This may be the case for example for said memory.

Certain resources of the network structure may be implemented to receive in parallel or simultaneously data flows from several other resources. This may be the case for example of a channel estimation resource which receives data comprising processing or calculation parameters from a resource and data comprising data to process or calculate from another resource.

Certain resources of the network structure may be implemented to emit in parallel or simultaneously data flows to several other resources. This may be the case for example of the "receiving" resource which divides data flows that it receives between a first decoding resource and said resource acting as the memory.

Certain resources may be used to emit sequentially data flows to several other resources. This may be the case for example of a resource permitting OFDM processing ("orthogonal frequency division multiplexing") which splits its outputs between a resource permitting a channel estimation to be made and a resource permitting a channel correction to be made.

DOCUMENTS MENTIONED

[1]: Christopher J. Glass and Lionel M. Ni; "The Turn Model for Adaptive Routing"; Advanced Computer Systems Laboratory, Department of Computer Science, 19th annual Symposium on Computer Architecture, May 19-21, 1992, 1992, pages 278-287.

[2]: Xiola Lin, Philipp K. Mckinley and Lionel M. Ni, "The Message Flow Model for Routing in Wormhole-Routed Networks", IEEE Transactions on Parallel and Distributed Systems, vol. 6, n°7, July 1995, pages 755-760.

[3]: Khalid M. Al-Tawil and al, "A Survey and Comparison of Wormhole Routing Technique in Mesh Networks" King Fahd University of Petroleum and Minerals, IEEE Network, March/April 1997, pages 38-45.

The invention claimed is:

1. A data processing method in a network on a chip formed of a plurality of processors configured to communicate between one another, and at least one network controller configured to initialize communications in the network, the method comprising:

receiving and storing in a memory by a first processor of the plurality of processors a sequential selection instruction and several credit management configuration programs received from the network controller, each credit management configuration program including an identity of an other processor and a number of credits to be sent to said other processor, the number of credits corresponding to a quantity of data that the other processor will be authorized to emit to the first processor, establishing a first communication between at least said first processor and at least one second processor, said establishing the first communication including (a) emitting, by the first processor, at least one of a first plurality of credits destined for the second processor, a destination and number of credits emitted by the first processor being defined in a common credit management configuration program that the first processor uses, the common credit management configuration program being selected from the several credit management configuration programs stored in the memory of the first processor, and selected according to the sequential selection instruction sent by the network controller; and (b) receiving, by the first processor, a first plurality of data to process sent by the second processor, the first plurality of data sent by the second processor to the first processor being authorized following receipt by the second processor of the credits emitted by the first processor.

2. The method according to claim 1, wherein the method further comprises:

establishing a second communication between said first processor and said second processor or a third processor, said establishing the second communication including, a') emitting, by the first processor, a second plurality of credits destined for the second processor or the third processor, and b') receiving, by the first processor, a second plurality of data to process sent by the second processor or the third processor.

3. The method according to claim 2, further comprising:

processing, with the first processor, at least part of the second plurality of data sent by the second processor or the third processor.

4. The method according to claim 3, further comprising:

sending, with the first processor, to a fourth processor, following the receipt of the first and/or the second plurality of data to process, the first and/or the second plurality of data to process and/or data processed by the first processor.

5. The method according to claim 2, further comprising:

before step a') or between steps a') and b') or after step b'), emitting to a fourth processor at Least part of the first plurality of data to process received by the first processor during step b) and/or at least part of the first plurality of data received by the first resource during step b) and processed by the first processor.

6. The method according to claim 5, further comprising:

receiving and storing in the memory of the first processor, data management configuration data from the network controller, the data management configuration data indicating one or more types of processing on data and/or at least one other processor to which the data that is processed or is to be processed is sent.

7. The method according to claim 6, wherein the first plurality of data to process received during step b) and/or the second plurality of data to process received during step b') includes tag data including data management configuration selection data among a plurality of data management configurations stored.

8. The method according to claim 1, wherein said credit management configuration programs stored in the memory of the first processor are sent to the first processor by said network controller prior to any exchange of data or credits between the processors of the network.

9. The method according to claim 1, wherein a quantity of data received by the first processor depends on a quantity of credits emitted by the first processor at step a).

10. The method according to claim 1, further comprising: prior to step a), issuing, by the network controller, an instruction to start communications in the network.

11. The method according to claim 1, wherein said sequential selection instruction for one or more credit management configurations includes an instruction to start communications in the network sent prior to step a) by the network controller.

12. The method according to claim 1, further comprising: sending, with a processor, an interruption to the network controller.

13. A network on a chip device, comprising:
at least one processor configured to communicate with one or several other processors of the network, said at least one processor including means for forming an interface with the network,
said means for forming the interface with the network including
  means for storing several different credit management configuration programs containing an identity of an other processor and a number of credits to be sent to the other processor;
  configuration selection means for selecting at least one current credit management configuration program among several different credit management configuration programs stored in said means for storing, according to a sequential selection instruction;
  means for emitting credits to one or more processors of the network, a destination of the credits being emitted by the means for emitting depending on a credit management configuration selected by said configuration selection means;
  means for receiving credits from one or more processors of the network;
  means for emitting data to process to one or more processors of the network,
  means for receiving data to process from one or more processors of the network; and
  means for authorizing the means for emitting to emit the data to process to at least one first processor of said other processors of the network following receipt, by said means for receiving, of credits from said first processor.

14. The device of claim 13, wherein the means for forming the interface with the network further comprises:
means for authorizing receipt of data from at least one second processor following receipt of credits from said second processor.

15. The device of claim 13, further comprising:
a network controller configured to permit communications to be initialized,
wherein said configuration selection means selects at least one common credit management configuration program from said several credit management configuration programs, in function of at least one sequential instruction from the network controller.

16. The device of claim 13, wherein the destination of data emitted by the means for emitting depends on a data management configuration program,
said means for storing stores several different data management configuration programs, and
the configuration selection means selects at least one common data management configuration program from said several data management configuration programs.

17. The device of claim 16, wherein the configuration selection means selects the at least one common data management configuration program from said several data management configuration programs based on at least one selection data or tag included in a data packet received by said means for receiving.

18. The device of claim 16, further comprising:
means for forming an operating core capable of carrying out at least one data process.

19. The device of claim 18, wherein said means for forming the operating core depends on the common data management configuration program selected by the configuration selection means, and
the means for forming the interface with the network further includes the configuration selection means.

20. The device of claim 13, wherein said means for forming the interface with the network includes means for emitting interruptions.

21. The device of claim 13, wherein said processor includes means for processing several simultaneous incoming data flows and/or credits, and means for processing several simultaneous outgoing data flows and/or credits.

22. The device of claim 13, wherein said processor includes means for processing several incoming sequential data flows and/or credits, and means for processing several outgoing sequential data flows and/or credits.

23. The method of claim 1, wherein the common credit configuration management program ensures synchronization of communications between the first processor and other processors of the network, identifies the second processor that the first processor communicates with in the establishing step, and identifies the number of credits emitted to the second processor in the emitting step.

24. The network on chip device of claim 13, wherein the one current credit configuration management program ensures synchronization of communications between the at least one processor and the other processors of the network, identifies another processor that the at least one processor communicates with, and identifies a number of credits emitted to the another processor by the means for emitting.

* * * * *